United States Patent [19]
Doshi et al.

[11] Patent Number: 5,568,475
[45] Date of Patent: *Oct. 22, 1996

[54] ATM NETWORK ARCHITECTURE EMPLOYING AN OUT-OF-BAND SIGNALING NETWORK

[75] Inventors: Bharat T. Doshi, Holmdel; N. Farber, Freehold; P. Harshavardhana; Rajiv Kapoor, both of Marlboro; Arik Kashper, Holmdel; Steven S. Katz, Ocean; Kathleen S. Meier-Hellstern, Cranbury; Thomas S. Guiffrida, Middletown, all of N.J.

[73] Assignee: Lucent Technologies Inc., Murray Hill, N.J.

[*] Notice: The term of this patent shall not extend beyond the expiration date of Pat. No. 5,483,527.

[21] Appl. No.: 360,897

[22] Filed: Dec. 21, 1994

[51] Int. Cl.$^6$ .................................................. H04L 12/64
[52] U.S. Cl. .................... 370/58.2; 370/60.1; 370/79; 370/110.1; 370/94.2; 379/220; 379/230; 379/246
[58] Field of Search ........................... 370/58.2, 58.3, 370/60, 60.1, 79, 94.1, 94.2, 110.1; 379/219, 220, 224, 229, 230, 235, 236, 237, 240, 246, 339, 353

[56] References Cited

U.S. PATENT DOCUMENTS

| | | | |
|---|---|---|---|
| 5,086,461 | 2/1992 | Thorn et al. | 379/230 |
| 5,220,563 | 6/1993 | Grenot et al. | 370/94.1 |
| 5,282,244 | 1/1994 | Fuller et al. | 379/230 |
| 5,345,445 | 9/1994 | Hiller et al. | 370/60.1 |
| 5,363,433 | 11/1994 | Isono | 370/94.1 X |
| 5,384,840 | 1/1995 | Blatchford et al. | 379/229 |
| 5,400,339 | 3/1995 | Sekine et al. | 370/94.2 |
| 5,422,882 | 6/1995 | Hiller et al. | 370/60.1 |

*Primary Examiner*—Alpus H. Hsu
*Assistant Examiner*—Russell W. Blum
*Attorney, Agent, or Firm*—Frederick B. Luludis

[57] ABSTRACT

An Asynchronous Transfer(ATM) network comprising a plurality of ATM switches may be arranged so that it receives calls from Synchronous Transfer Mode (STM) switches that employ out-of-band signaling such that the ATM switches communicate telephone call signaling information between each other and the STM switches via an out-of-band signaling network associated with the ATM network and interface with out-of-band networks associated with the STM switches.

17 Claims, 5 Drawing Sheets

| | INCOMING TRUNK | INCOMING TRUNK SUBGROUP | INCOMING PORT | VCI | VPI |
|---|---|---|---|---|---|
| 401 | $T_k$ | $TSG_j$ | $P_m$ | $VCI_k$ | $VPI_j$ |
| | ⋮ | ⋮ | ⋮ | ⋮ | ⋮ |
| 402 | 1 | 27 | 27 | 1 | 27 |
| | ⋮ | ⋮ | ⋮ | ⋮ | ⋮ |
| | $T_{n-1}$ | $TSG_{n-1}$ | $P_{n-1}$ | $VCI_{n-1}$ | $VPI_{n-1}$ |
| | $T_n$ | $TSG_n$ | $P_n$ | $VCI_n$ | $VPI_n$ |
| | 411 | 412 | 413 | 414 | 415 |

| TRUNK | TRUNK SUBGROUP | BUSY(1)/ IDLE(0) |
|---|---|---|
| $T_1$ | $TSG_p$ | 1 |
| ⋮ | ⋮ | ⋮ |
| $T_n$ | $TSG_p$ | 0 |
| $T_1$ | $TSG_t$ | 0 |
| $T_2$ | $TSG_t$ | 1 |
| $T_3$ | $TSG_t$ | 1 |
| ⋮ | ⋮ | ⋮ |
| $T_{n-x}$ | $TSG_t$ | 0 |
| ⋮ | ⋮ | ⋮ |

| INCOMING TRUNK | INCOMING TRUNK SUBGROUP | INCOMING PORT | VCI | VPI |
|---|---|---|---|---|
| $T_k$ | $TSG_i$ | $P_m$ | $VCI_k$ | $VPI_i$ |
| ⋮ | ⋮ | ⋮ | ⋮ | ⋮ |
| 1 | 27 | 27 | 1 | 27 |
| ⋮ | ⋮ | ⋮ | ⋮ | ⋮ |
| $T_{n-1}$ | $TSG_{n-1}$ | $P_{n-1}$ | $VCI_{n-1}$ | $VPI_{n-1}$ |
| $T_n$ | $TSG_n$ | $P_n$ | $VCI_n$ | $VPI_n$ |

| OUTGOING TRUNK | OUTGOING TRUNK SUBGROUP | OUTGOING PORT | $VCI_0$ | $VPI_0$ |
|---|---|---|---|---|
| $T_a$ | $TSG_b$ | $P_a$ | $VCI_a$ | $VPI_b$ |
| ⋮ | ⋮ | ⋮ | ⋮ | ⋮ |
| $T_e$ | $TSG_d$ | $P_e$ | $VCI_e$ | $VPI_d$ |
| ⋮ | ⋮ | ⋮ | ⋮ | ⋮ |
| 213-1 | 60 | 213-1 | 213-1 | 60 |
| ⋮ | ⋮ | ⋮ | ⋮ | ⋮ |

FIG. 5

| OUTGOING VCI | OUTGOING VPI | OUTGOING PORT | OUTGOING VCI | OUTGOING VPI |
|---|---|---|---|---|
| 1 | 27 | 213-1 | 213-1 | 60 |
| 2 | 27 | – | – | – |
| ⋮ | ⋮ | ⋮ | ⋮ | ⋮ |
| n | 27 | x | y | 60 |
| ⋮ | ⋮ | ⋮ | ⋮ | ⋮ |

ATM NETWORK ARCHITECTURE EMPLOYING AN OUT-OF-BAND SIGNALING NETWORK

FIELD OF THE INVENTION

The invention relates to an architecture for a telecommunications network comprising Asynchronous Transfer Mode switches interfacing with existing out-of-band signaling networks, such as the SS7 signaling network, as well as Synchronous Transfer Mode transport networks.

BACKGROUND OF THE INVENTION

In telecommunications systems, the vehicle that will most likely be used for offering a wide range of different high-bandwidth services, e.g., multimedia services, will most likely be based on Asynchronous Transfer Mode (ATM) protocols. These protocols define a particular data structure called a "cell", which is a data packet of a fixed size (53 octets, each octet comprising eight bits). A cell is formed by a header (five octets) and payload (48 octets) for transporting routing and user information.

The cell-routing concept in ATM is based on two aspects comprising a routing field in the cell header containing a Virtual Path Identifier (VPI) and Virtual Channel Identifier (VCI). The VCI and VPI pair have only local significance on the link between ATM switches (nodes). ATM switches as well as so-called cross-connect apparatus use routing tables to map VCI and VPI values received via an incoming link to outgoing values and an outgoing link as a way of routing the associated cell through the ATM switch (or cross-connect apparatus). A virtual Circuit Link (VCL) is a logical link between two switches (or a cross-connect nodes) and is identified by a VCI value. Similarly, a Virtual Path Link (VPL) is a logical link between two switches (or cross-connect nodes) identified by a respective VPI value. A virtual Circuit Connection (VCC) is an end-to-end connection between two devices and is formed by the concatenation of VCLs, and a Virtual Path Connection (VPC) is formed by the concatenation of VPLs. If an appreciable number of VCCs follow the same route segment, then it is likely that they will share the same VPC associated with that segment. In such a case, intermediate switches do not change the VCI values, and, therefore, are referred to as VP switches.

Current telephone networks as well as their associated transmission media, routing and cross-connection devices are digital circuit switched facilities, in which the routing of user information, e.g., voice and voice band-data services, from a source to a destination is via an end-to-end switched connection, which is dedicated for the duration of an associated call using the connection. That is, the call is set-up by assigning it to an idle time slot (one for each link) of a frame of time slots that are transported over a digital link(s) interconnecting origination and destination switches. As such, the connection is semi-permanent—lasting only for the duration of the associated call.

In contrast, an ATM network does not use dedicated time slots. Instead, VCCs and VPCs share the network resources asynchronously. An ATM network thus has to ensure that it has sufficient resources to handle the traffic that is transported via the VCCs and/or VPCs that it has established (set up).

It is well-known that current circuit-switched voice and voice-band data services use one of a number of different signaling and messaging techniques for the purpose of establishing a circuit switched connection between Synchronous Transfer Mode (STM) switches or accessing network databases to process special telephone services. Such signaling techniques include in-band signaling using so-called "borrowed bits" associated with a data stream; in-band signaling using Multi-Frequency (MF) tones, and out-of-band signaling using a separate packet network. In-band signaling using "borrowed bits" is used by customer premises equipment (e.g., a private branch exchange) to signal an STM network switch over a digital transmission facility. MF in-band signaling is still used in some of the switches associated with Local Exchange Carriers (LEC) to set up a call connection, but such signaling is being replaced by out-of-band packet signaling, for example, the packet signaling provided by the well-known Signaling System 7 (SS7). SS7 signaling is used by Interexchange Carrier (IXC) networks (e.g., AT&T) to establish call connections over their associated intertoll digital networks and to access network databases. Advantageously, most, but not all, LEC switches are now being provided with the SS7 type of out-of-band signaling capability.

Network switches perform other functions in addition to signaling. These other functions include, for example, Digital Signal Processing (DSP) functions such as detecting special tones, playing recorded announcements, canceling echoes, etc.

Presently, the designers of telecommunications networks are seriously considering replacing the STM switching and associated transport facilities with Broadband ISDN (B-ISDN) based on ATM as the underlying technology. What this means is that the circuit switched structure, associated signaling systems, databases, operations systems, etc., will be replaced by systems using ATM based transport, signaling and messaging. At this point in time, it appears that changing the STM switched transport to ATM transport may be relatively easy and could be accomplished in the near future. However, network signaling and messaging have been designed and developed over many years to guarantee that critical network applications will operate correctly. It is therefore unlikely that the entire signaling network will be converted at once to broadband signaling. It is also unlikely that a telecommunications carrier (LEC or IXC) will replace its entire STM network at once with a B-ISDN/ATM network, but will more likely migrate toward that end in stages such that during intermediate stages of the conversion network may be composed of STM and ATM elements. Accordingly, there will be a need to develop technology that will gracefully interface STM elements with ATM elements and allow ATM type switches to interface with the different types of existing signaling networks. The need for such interfacing has been recognized, but has been limited to the transport of user information only. Accordingly, the relevant technology has only advanced to the point of defining a Terminal Adapter (TA) function to implement appropriate ATM Adaptation Layer (AAL) protocols to interface conventional circuit-switched-transport protocols (e.g., time slot protocols for voice and dedicated circuits) with ATM based transport protocols.

SUMMARY OF THE INVENTION

The art of telephone switching is advanced in accord with an aspect of the invention by arranging an ATM switch of an ATM network (and cross-connect apparatus) so that it exchanges signaling information with an STM switch and/or another ATM switch via a signaling mechanism that is employed by the STM switch to forward a call to a destination, for example, out-band signaling. In particular, we achieve an advantage by interconnecting the ATM switch with an out-of-band signaling mechanism, for example, the SS7 network, and, then, in response to receiving from a STM or ATM switch via the signaling network a message containing, inter alia, an identity of a trunk that the sending switch will use to forward a telephone call to the ATM switch, translating the trunk identity into an identifier understood by the ATM switch, i.e., a virtual circuit identifier indicative of a virtual circuit over which information associated with the call will be received at an incoming port.

In accord with an aspect of the invention, the translation may be done on a one-to-one basis such that the virtual circuit identifier is made to be equivalent to the identity of the trunk. Similarly, the virtual path identifier is made to be equivalent to the identity of the associated trunk subgroup.

These and other aspects of the invention will be appreciated as they are disclosed in the following detailed description and accompanying drawings.

BRIEF DESCRIPTION OF THE DRAWING

In the drawing:

FIG. 2 illustrates a conventional busy/idle status table that is maintained by a call processor of FIG. 1;

FIG. 3 illustrates a translation table that a call processor of FIG. 1 may use to translate, in accord with the principles of the invention, the address of an incoming trunk and associated trunk subgroup into an incoming port, VCI and VPI;

FIG. 4 illustrates a translation table that a call processor of FIG. 1 may use to translate between, in accord with the principles of the invention, the address of an outgoing trunk and associated trunk subgroup into an outgoing port, VCI and VPI;

FIG. 5 illustrates a table that an ATM input controller of FIG. 1 populates with routing information relating to the routing of incoming VCI and VPI to an outgoing port, VCI and VPI;

DETAILED DESCRIPTION

Figure 1:
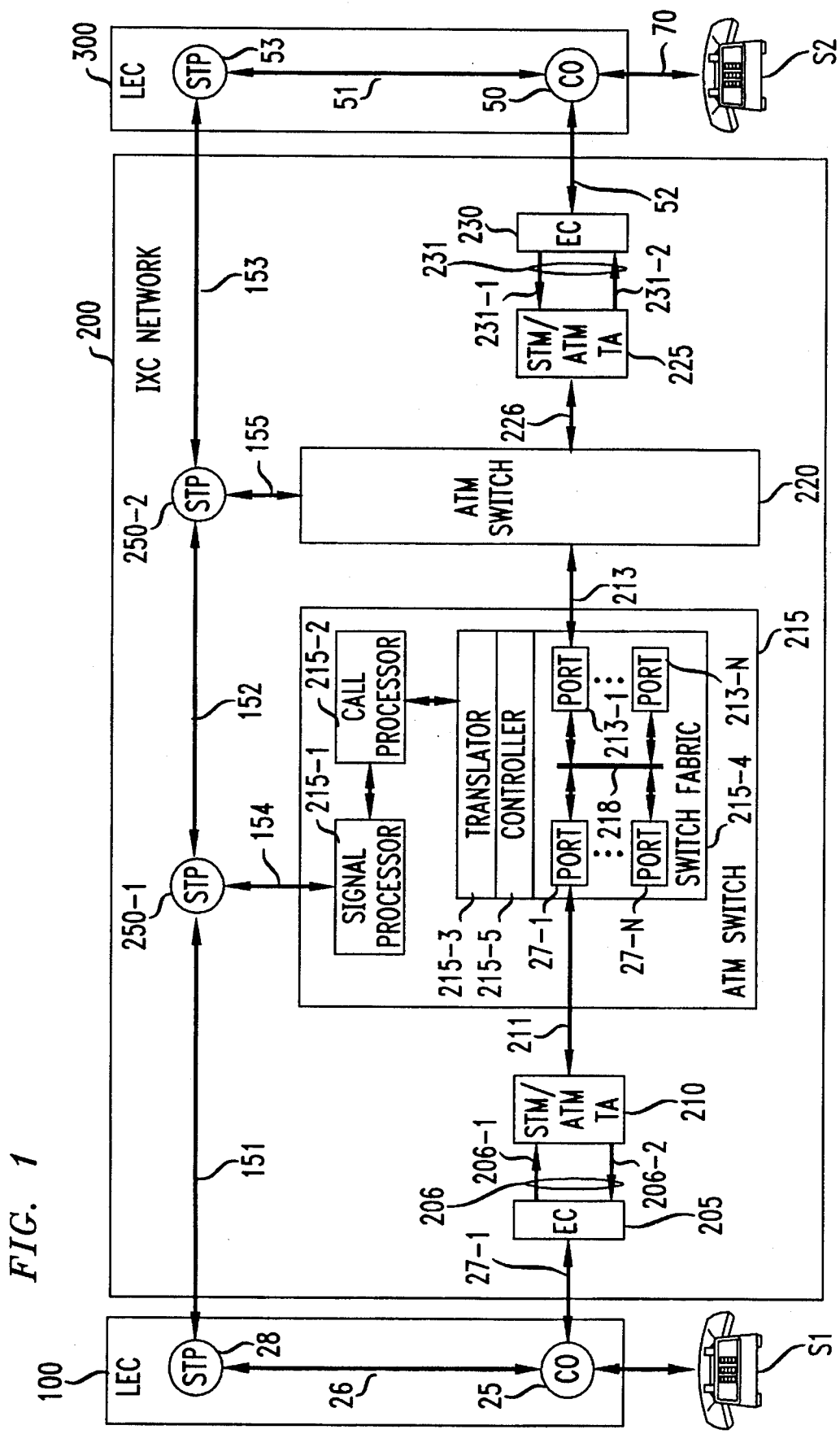
FIG. 1 is a broad block diagram of an illustrative ATM network in which the principles of the invention may be practiced.

An exemplary embodiment of an ATM network arranged as an IntereXChange Carrier network is shown in FIG. 1. ATM network 200 includes a plurality of interconnected ATM switches. For the sake of clarity and simplicity only two ATM switches are shown in the FIG., namely ATM switches 215 and 220. ATM switches 215 and 220 are connected to one another via an ATM intertoll network 213 and are respectively connected to Local Exchange Carrier (LEC) networks 100 and 300. Network 200 also includes a Signal System 7 (SS7) network connected to the network 200 switches via respective signaling links, e.g., links 154 and 155, and associated Signal Transfer Points (STP), e.g., STPs 250-1 and 250-2. In accord with an aspect of the invention, the network 200 ATM switches use the SS7 network to communicate signaling information to each other for the purpose of establishing respective virtual circuits, as will be discussed below in detail. Thus, in accord with an aspect of the invention, the ATM switches use the SS7 network to establish a virtual circuit connection, rather than a circuit switched connection, as is the case in STM networks. The signaling between the LEC CO switch and the IXC ATM switch may be in-band or out-of-band using the SS7 signaling network. In accord with an illustrative embodiment of the invention, a LEC CO switch may also use out-of-band signaling.

As is well-known, a LEC network comprises a plurality of so-called local Central Offices (CO) each of which may be, for example, the No. 5ESS switch available from AT&T and described in the *AT&T Technical Journal*, Vol. 64, No. 6, July/August 1985, pages 1303–1564. For the sake of clarity and simplicity only one CO is shown in each LEC network 100 and 300. In an illustrative embodiment of the invention, a CO switch operates in a Synchronous Transfer Mode (STM) to transport speech signals associated with a particular call over a circuit-switched connection in digital form. That is, a CO samples analog speech signals that it receives from a telephone station set at an 8 khz rate and supplies the resulting digital signals (samples) synchronously at a 64 kbs rate over the associated connection, in which each such sample is formed by, for example, eight bits (8-bit byte). Conversely, A CO converts digital signals that it receives over a circuit switched connection into analog signals and then supplies the resulting signals to a telephone line connected to a respective telephone station set engaged in the call.

More particularly, a CO, e.g., CO 25, responsive to receipt of a telephone call originated by an associated telephone station set, e.g., station set S1, and responsive to a user thereat dialing a telephone number identifying a called telephone station set, e.g., station set S2, collects the digits as they are dialed by user. When CO 25 receives the last of the dialed digits, it then routes the call towards its destination via a trunk selected as a function of the dialed telephone number. The selected trunk, in turn, connects CO 25 to a next switch that will form part of the connection from the calling station to the called station set. As is well known, and as discussed to some extent above, a CO alerts the next switch, i.e., ATM switch 215, by sending a call set-up message thereto via a signaling path. As mentioned above, such signaling may be inband signaling, out-of-band signaling, etc. Assume at this point that the CO uses out-of-band signaling which is sent over an associated SS7 network. With this signaling mechanism, a call set-up message contains, inter alia, (a) the dialed telephone number, (b) ANI identifying the calling station, (c) identifiers respectively identifying the trunk and associated trunk subgroup that will be used to route the call to switch 215, (d) a request for an end-to-end connection and (e) the address of switch 215. It will be assumed at this point that CO 25 transmits the message via link 26 and STP 28 of the LEC 100 SS7 network. (The transmitted call set-up message will also be referred to herein as an Initial Address Message (IAM).)

Responsive to receipt of the IAM, STP 28 forwards the message to a destination STP—STP 250-1—identified as a function of the address contained in the received message. In a similar manner, STP 250-1 forwards the message to switch 215 via data link 154, which supplies the message to signal processor 215-1 interfacing ATM switch 215 with the SS7 network. Signal processor 215-1, in turn, presents the received IAM to call processor 215-2. Call processor 215-2 stores the IAM in associated memory and, identifies, as a function of the dialed number, the next, or destination, switch that may be used to establish the next or last segment of the connection to the destination CO, e.g., CO 50. Since the called station set is station S2, then call processor 215-2 identifies ATM switch 220 as the destination IXC switch and identifies an idle one of its outgoing trunks and associated trunk subgroup that may be used to forward the incoming call to switch 220 via transmission path 213. Call processor 215-2 does this by first translating the dialed number into the Network Switch Number (NSN) assigned to switch 220. Call processor 215-2 then selects an idle outgoing trunk that may be used to forward the call to switch 220. Call processor 215-2 selects such a trunk by translating the determined NSN into one or more trunk subgroups. Call processor 215-2 then consults a trunk subgroup status map which it maintains in its associated memory to identify an outgoing trunk in one of the latter subgroups that is idle and may be used to forward the call to the destination switch. (An example of such status map is shown in FIG. 2, which is self explanatory.)

Assuming that the selected outgoing trunk and subgroup are, for example, outgoing trunk 213-1 of subgroup 60 (not shown in the FIG.), then controller 215-2 forms its own IAM message containing the call information and identities (i.e., 213-1 and 60) of the trunk and subgroup that will be used to forward the call to switch 220. Call processor 215-2 then sends the latter IAM to STP 250-1 via signal processor 215-2 and data link 154 for forwarding to switch 220. STP 250-1, in turn and in a conventional manner, sends the message to STP 250-2 for delivery to ATM switch 220 vial link 155. Similarly, the switch 220 call processor (not shown) locates an idle outgoing trunk that may be used to connect the call to CO 50 and similarly creates its own IAM message for transmission to CO 50 via link 155, STP 250-2, LEC 300 STP 53 and data link 51.

CO 50, responsive to receipt of the IAM determines if the telephone connection 70 to station S2 is busy. If so, then CO 50 returns a busy message indicative thereof to switch 220 via the LEC 300 SS7 network. In response to receipt of the message, the call processor of switch 220 releases its outgoing trunk to CO 50 and forwards the busy message to switch 215 via the network 200 SS7 network. Similarly, call processor 215-2 releases outgoing trunk 213-1 of subgroup 60 and forwards the message to CO 25 via the SS7 networks of network 200 and LEC 100. CO 25, in turn, supplies busy tone to station S1 and releases its outgoing trunk to switch 215.

If, on the other hand, telephone line 70 is not busy, then CO 50 returns a call complete message indicative thereof to switch 220 via the aforementioned SS7 network, and supplies ringing voltage to telephone line 70. Switch 220, responsive to receipt of the call complete message passes the message to its associated call processor. The switch 220 call processor then (a) forwards the call complete message to switch 215 via its associated signal processor and the SS7 network of network 200, (b) changes the status of its incoming trunk and outgoing trunk that will be involved in routing the call through its associated switching fabric to busy and (c) advises its associated translator circuit (not shown) of the connection involving the switch 220 incoming and outgoing trunks. (Since the architecture and operation of switch 220 is similar to that of switch 215, any discussion relating to switch 215 equally pertains to switch 220. Therefore, the following discussion of the operation of controller 215-3 equally pertains to the switch 220 controller, translator, etc., (not shown).)

In particular, signal processor 215-1 upon receipt of the call complete message via data link 154 passes the message to call processor 215-2. Similarly, processor 215-2 (a) forwards the call complete message to CO 25 via processor 215-1, STP 250-1 and the LEC 100 SS7 network, (b) changes the status of incoming trunk 27-1 and outgoing trunk 213-1 that will be involved in routing the call through its associated switching fabric to busy and (c) advises its associated translator circuit 215-3 of the connection that should be established between incoming trunk 1 of subgroup 27-1 and outgoing trunk 213-1 of subgroup 60. Translator 215-3, more particularly, translates the incoming trunk and trunk subgroup identifiers received from call processor 215-2 into a form that is "understood" by conventional ATM switch controller 215-5. That is, in accord with an aspect of the invention, translator 215-3 translates the identifiers—1, and 27-1—associated with the incoming trunk into (a) respective predetermined VC and VP identifiers and (b) an incoming port circuit, e.g., port 27-1. Translator 215-3 does this using translation Table 400 shown in FIG. 3. Briefly, Table 400 comprises a plurality of entries in which each entry comprises five fields 411 through 415 containing associated translation data. Referring to entry 401, for example, a data entry includes a trunk identifier (Tk) and associated trunk subgroup identifier (TSGi) in fields 411 and 412, respectively, which are translated into a predetermined incoming port (Pi), and VCIi and VPIi contained in fields 413 through 415, respectively. In accord with an aspect of the invention, such a translation is done on a one-to-one basis as shown for entry 402, which translator 215-3 accesses to translate the trunk and trunk subgroup identifiers that it receives from call processor 215-2. For example, trunk and trunk subgroup identifiers 1 and 27-1, respectively, are translated on a one-to-one basis into a VCI of 1 and VPI of 27-1, respectively, as shown by the data inserted in fields 414 and 415 of entry 402. The trunk and TSG are also mapped into an identifier identifying an incoming port, i.e., incoming port 27, as shown by the contents of field 413 of entry 402. (Translator 215-3 uses a similar table to translate the outgoing trunk and outgoing trunk subgroup identifiers (213-1 and 60, respectively) into an outgoing port identifier, VCIo and VPIo. An illustrative example of such a table is shown in FIG. 4, in which entry 501 is used to do the latter translation.) Translator 215-3 then supplies the results of the translation to controller 215-5.

Controller 215-5 activates the virtual circuit connection from input port 1 to output port 213-1 so that speech signals originating at station set S1 and destined for station S2 may be transported over 45 switch fabric 215-4 during the associated virtual connection. Controller 215-5 does this by supplying the input VCI/VPI (1/27) to output VCI/VPI (213-1/60) mapping to input port 27. Port 27, in turn, enters the output VCI/VPI mapping data in a routing map. An example of the latter map is shown in FIG. 5. In particular, each of the switch 215 (220) port circuits stores a routing map 600 in its associated port memory (not shown). The contents of fields 602 and 603 of each entry in the table, e.g., entry 601, respectively contain a virtual channel and virtual path identifiers. That is, the virtual channels associated with a particular virtual path are entered in field 602 of sequential entries in the table, as shown for entry 601 and the following entries. Thereafter, when a port receives routing information from its associated controller 215-5, it enters the routing information in an appropriate one of the table 600 entries. For example, it is seen that routing information has been entered in fields 604 through 606 of entry 601. Thereafter, when input port 1 receives an ATM cell bearing a VCI and VPI of 1 and 27, respectively, then it processes the cell in accord with the contents of entry 601 of routing table 600, as will be explained below in detail.

Controller 215-5 also activates another, but opposite, virtual connection from port 213-1 to port 27 to transport speech or data signals that originate at station S2 and received via switch 220 and destined for station S1. Accordingly, an opposite virtual connection may be so activated when a cell carrying samples of station S2 speech samples (or voice-band data) are received via switch 220. (It is noted that switch 220 performs similar routing functions in response to receipt of the call complete message.)

When CO 25 receives the call complete message, it supplies an alerting tone to telephone line 26 to notify the user thereat that the call connection has been completed and that a ringing signal is being supplied to station S2. When the user at station S2 answers the call, then he/she may communicate with the station S1 user in which the ensuing speech (or voice-band data) will be transported via ATM network 200. Specifically, first considering speech signals received at CO 25 from station S1, CO 25 digitizes such signals in the manner described above and outputs the result to its associated trunk 1 of TSG 27. (It is noted that the latter trunk and TSG respectively correspond to a channel (channel 1) and group of channels (group 27) of a time frame during which CO transmits a digital sample of a station S1 speech signal over path 27-1. Echo Canceler 205 receives the digital sample and, in a conventional manner, cancels the sample if it represents an echo of a digital speech sample originating at station S2. If not, then the sample is presented to STM/ATM Terminal Adapter 210. TA 210, more particularly, is arranged to pack samples of voice signals as they are received from STM switch 25 via trunk (channel) 1 of trunk group 27 into an ATM cell. TA 210 maintains a predetermined table which it uses to map between trunks and VCIs and between trunk subgroups and VPIs transported over link 211. When a payload of 47 or 48 octets (depending on the particular ATM adaptation layer) have been so collected, then TA 210, in accord with an aspect of the invention, translates the trunk address and trunk group address over which the samples were received into a VCI, VPI and incoming port address. In accord with another aspect of the invention, such a translation is done at TA 210 (similarly so at TA 225) on a one-to-one basis. Accordingly, TA 210 translates a trunk address of 1 and a TSG address of 27 into a VCI of 1 and VPI of 27, respectively. TA 210 then forms a cell header of five octets including the translated VCI and VPI values and prepends (prefixes) the header to the 48 octet payload to form an ATM cell. TA 210 then supplies the resulting ATM cell to originating port 27-1 of switch 215. Port 27-1, responsive to receipt of the cell, checks its associated routing table 600 to determine if routing translation information has been stored therein for the VCI and VPI contained in the received cell. If not, port 27-1 discards the cell. Otherwise, port 27-1 translates the VCI and VPI contained in the cell into an outgoing address. In the instant case, port 27-1 translates the VCI and VPI of 1 and 27, respectively, into an outgoing port address of 213-1, VCI of 213-1 and VPI of 60 based on the contents of entry 601 of table 600 (FIG. 5). Port 27-1 then substitutes the latter VC and VP identifiers for the VCI and VPI identifiers contained in the received cell and presents the result to switch fabric 215-4 for routing, in a conventional manner. That is, switch fabric 215-4 routes the cell to port 213-1 via a virtual circuit connection identified by the VC and VP identifiers attached to the routed cell. Upon receipt of the cell from switch fabric 215-4, output port 213-1 stores the cell in a queue (e.g., a First-In, First-Out memory) associated with high-speed transmission path 213. When the data cell reaches the top of queue, it is then unloaded from the queue and transmitted, either by itself or part of a so-called super frame, over path 213 to destination ATM switch 220. ATM switch 220 then, using its own table 500, similarly translates the VC and VP identifiers in the received cell into output VC and VP identifiers and then routes the cell via its associated switch fabric and virtual circuit identified as a function of the latter identifiers. Upon receipt of the cell via the associated switch fabric, the switch 220 output port stores the cell in an associated queue. When the cell is thereafter unloaded from the queue it is transmitted over path 226 connected to TA 225. TA 225, in turn, translates the VC and VP identifiers contained in the received cell into trunk and trunk subgroup identifiers, in accord with an aspect of the invention. In accord with above mentioned aspect of the invention, such translation is done on a one-to-one basis. TA 225 then unpacks the payload of 48 octets of the received cell and supplies them to the so-called ATM Adaptation Layer (AAL) implemented in TA 225. The AAL (a) buffers the received octets, (b) removes the AAL header, if any, (c) performs AAL functions with respect to the received octets, and (d) then sends each octet in sequence to CO 50 via EC 230 and translated trunk and subgroup of path 52. As mentioned above, the latter trunk and trunk subgroup may be a time slot of a group of time slots, in which the such transmission of octets over path 231-1 occurs during the identified time slot.

As mentioned above, an STM switch may employ in-band MF signaling to communicate signaling information to an IXC. We have recognized that ATM network 200 may be readily adapted to receive such information via in-band signaling and then, in accord with an aspect of the invention, present such information to the originating ATM switch, e.g., switch 215, via another signaling network, e.g., the SS7 network. Thus, the architecture of network 200 does not have to change to interface with a signaling technique different from the signaling technique employed by the SS7 network. Advantageously, then, ATM network 200 may interface with central offices using different signaling techniques to communicate signaling information to a next switch, wherein the next switch may be an ATM switch rather than an STM switch.

Figure 6:
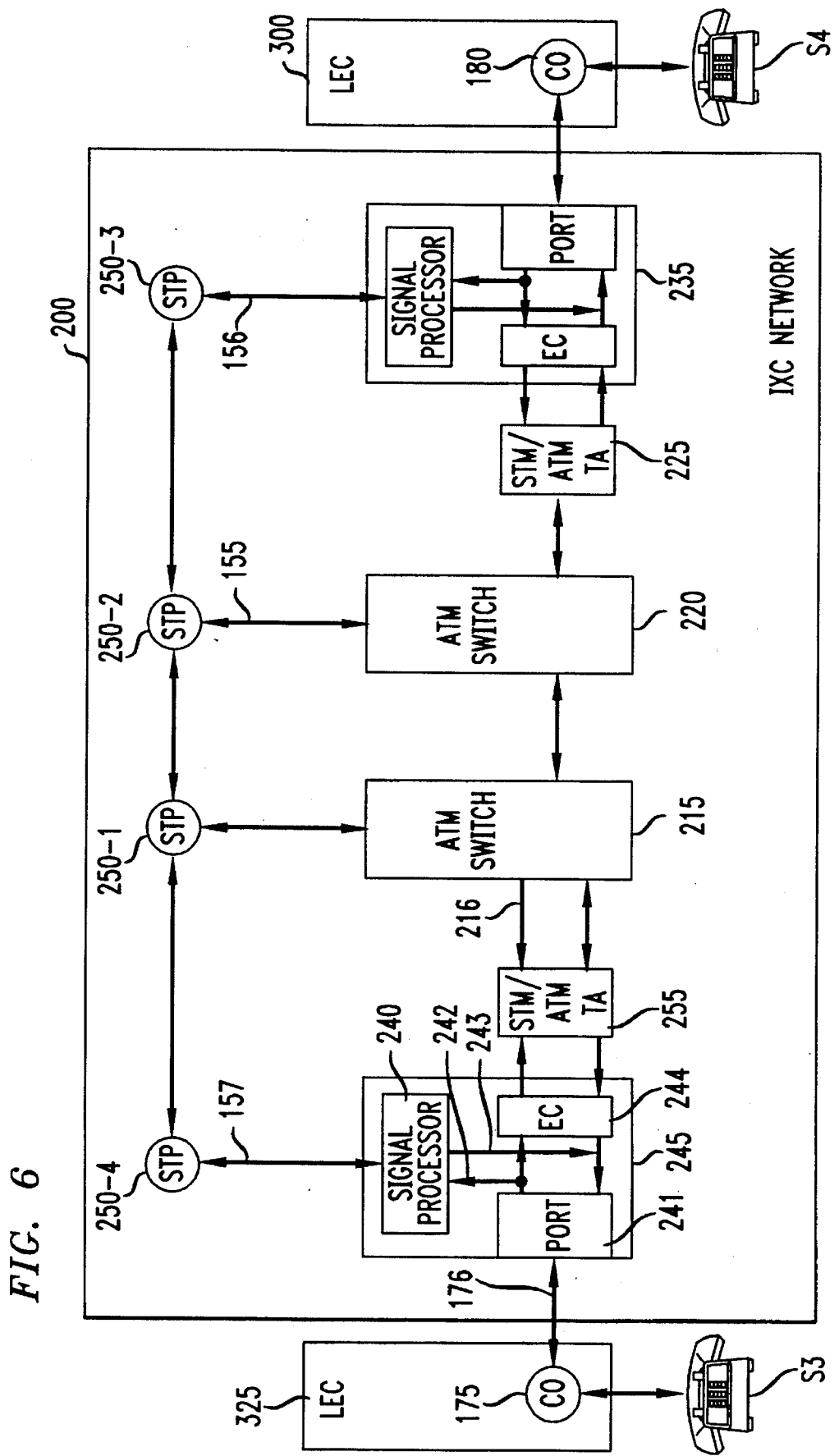
FIG. 6 is broad block diagram of an illustrative ATM network arranged to interface with MF inband signaling in accord with an aspect of the principles of the invention.

Referring then to FIG. 6, assume that the user at station set S3 places a call to station set S4 by going off-hook and dialing the telephone number associated with the latter station set. When CO 175 has collected the last of the dialed digits and has determined that the call is to be routed via network 200, it selects an idle trunk connecting to network 200 and transmits an off-hook signal thereto over the selected trunk and path 176. Signal processor 240 of module 245 monitors the signals received via the selected trunk of port 241 and returns a signal over the trunk to CO 175 if the call can be accepted by TA 255 (referred to as TA 210 in FIG. 1). Assuming that TA 255 accepts the call, then CO 175 begins to transmit the dialed telephone number and caller's ANI via the selected trunk (digital channel of path 176). Interface port 241 of module 245 multiplexes the contents (eight bit byte) of each trunk (channel) to a respective signal path 242 extending to an associated EC 244, which then presents the byte to Terminal Adapter (TA) 255. TA 255, in turn, accumulates such bytes as they are received from the source trunk to form a cell and then presents the cell to an associated input port of switch 215, as described above. However, the input port discards the cell since a virtual circuit connection for the call has not yet been activated. If, on the other hand, the data byte contains signaling information (e.g., dialed digits), then port 241 extracts the signaling information and sends it to signal processor 240 via path 242. Signal processor 240, responsive to data indicative of a MF signal appearing on path 242, collects the data and succeeding such data until it has accumulated the signals indicative of at least the called telephone number. Signal processor 240 then, as described above, forms an SS7 IAM message containing, inter alia, (a) the dialed telephone number, (b) ANI identifying the calling station, if acquired (c) identifiers respectively identifying the trunk and associated trunk subgroup over which the calling information was received, (d) a request for an end-to-end connection and (e) the address of switch 215. Signal processor 245 then transmits the message via data link 157 and STP 250-4. Switch 215 and then switch 220 process the IAM message in the manner discussed above. That is, the switch 220 call processor locates an idle outgoing trunk that may be used to route the call to the destination CO and then creates its own IAM message for transmission via link 155 and STP 250-2 to the network 200 signal transfer point that interfaces with that CO. The latter STP, in turn, retransmits the message to STP 250-3 for delivery to signal processor 240 of module 235. Responsive to receipt of the IAM message via link 156, signal processor 240 of module 235 selects the idle trunk to CO 180 (associated with the trunk from switch 250 to TA 225) and sends an off-hook signal thereto via port 241 of module 235 and the selected trunk. If CO 180 can accept the call, then it returns an off-hook signal via the latter trunk. Signal processor 240 of module 235 responds to the off-hook by transmitting the called number contained in the received IAM message over the selected trunk to CO 180. In addition, signal processor 240 of module 235 returns a call complete message to switch 220 via the network 200 SS7 network, in which the latter message contains the trunk and TSG of the trunk selected by the latter signals processor. ATM switch 220 processes the call complete message in the manner described above and transmits a call complete message to switch 215, which similarly processes the message in the manner described above. As also mentioned above, switch 215 returns an SS7 call complete message to the originating CO. However, in the instance case, the latter message is sent via signal processor 240 of module 245. Signal processor, in turn, sends an off-hook (wink) signal to CO 175 via the trunk that CO 175 selected to route the station set S3 call to network 200. As is well-known, the latter wink signal is a functional equivalent of the SS7 call complete message. When the station S4 user answers the call, then the station S3 user may begin to communicate with the station S4 user via the virtual connections that are respectively established by switches 215 and 220 as they are needed.

When either the station set S3 or S4 user terminates the call—"hangs up", then CO 175 or 180, as the case may be, sends an on-hook signal to network 200. Assuming that the on-hook signal is sent by CO 175 over the selected trunk connecting to module 245, then signal processor 240 of module 245, responsive to receipt of the on-hook signal (sent by port 241 of module 245), forms an SS7 network call termination message containing, inter alia, the identity of the latter trunk and its associated TSG and then sends the message to switch 215 via data link 157 and the SS7 network. Upon receipt of the termination message, the switch 215 call processor (a) directs the input port associated with the call to clear the entry that it made in its translation Table 600 for the call, (FIG. 5), (b) sets the status of the trunk to idle in the status table (FIG. 2) associated with switch 215 and (c) sends a call termination message to switch 220, in which the latter message identifies the trunk and TSG identifiers that translate to VCI and VPI that are used to route the call from switch 215 to switch 220. The switch 220 call processor responds similarly to the receipt of the latter message and sends a call termination message to the destination CO via link 155 and STP 250-2 such that the message is instead delivered to signal processor 240 of module 135 via STP 250-3 and link 156. The latter signal processor, in turn, transmits an on-hook signal to CO 180. CO 180 sets the status of the return path of the trunk connecting to module 235 to idle and then waits for the station set S4 user to "hang-up".

As mentioned above, an incoming port of an ATM switch discards a data cell if a virtual circuit connection for the associated call has not been activated. Alternatively, such discarding may be done at the Terminal Adapter, e.g., TA 255, 210. etc., at the direction of the call processor of the associated ATM switch, e.g., switch 215. Specifically, TA 255 ( 210, etc.,) may be arranged so that it receives control instructions from the associated call processor via a communications path connecting the TA to the call processor. Such a path may comprise a virtual circuit connection from the call processor through the switch fabric to a control port connecting connections to the TA via path 216. In this way, the call processor may instruct the TA not to accumulate data received via a particular trunk, i.e., an idle trunk. Thereafter, when the trunk become busy and a virtual circuit has been assigned thereto, then the call processor instructs the TA to begin forming data cells from the data received via the trunk.

Figure 7:
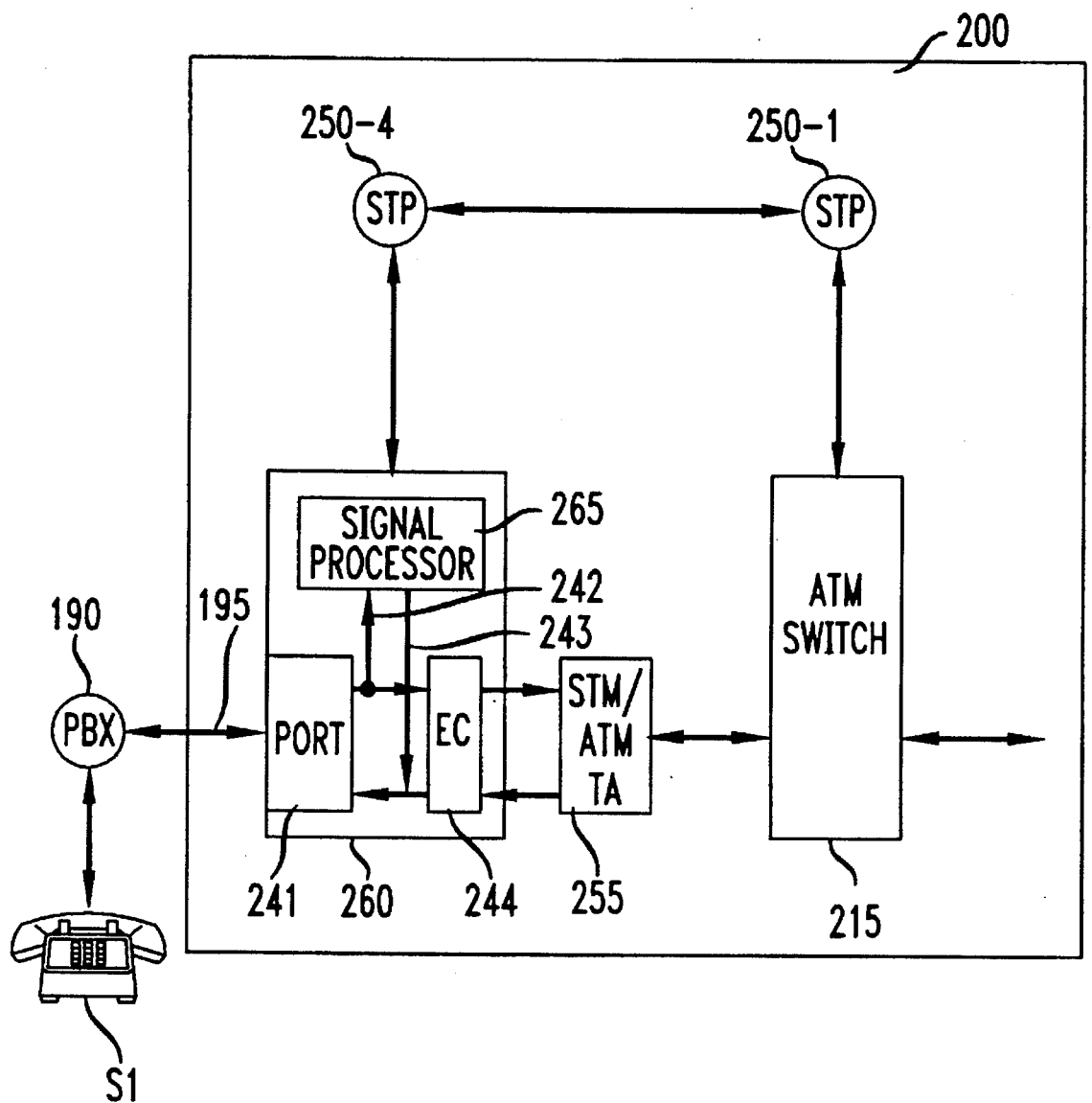
FIG. 7 is a simplified block diagram of an illustrative ATM network arranged to interface, in accord with an aspect of the invention, a signaling arrangement that is based on the "borrowed bit" scheme.

As also mentioned above, the architecture of network 200 does not change to interface with a method of signaling different than Signaling System 7. ATM network 200 may thus interface with central offices, or other entities, that use different signaling techniques, as discussed above in connection with in-band signaling. One such entity that is commonly referred to as a nodal, for example, a Private Branch Exchange (PBX), uses a "bit borrowing" scheme to transmit signaling information. Turning then to FIG. 7, there is shown nodal (PBX) 190 connected to network 200 via communications path 195, in which the latter path 195 may be a so-called T1 carrier transmission line. As is well-known, the transmission protocol that is used in a T1 carrier system is a 125 microsecond frame composed of 24 channels in which each channel comprises eight bits. A telephone call is routed via the T1 carrier system via a channel assigned to the call. For example, PBX 190 routes long distance calls originating at PBX 190 to network (or IXC ) 200 by assigning each such call to a respective one of the aforementioned channels for the duration of the call. In this sense a channel is either busy (off-hook) or idle (on-hook). Signaling information indicative of whether a channel is off-hook or on-hook is transmitted over the channel by "borrowing" one bit (i.e., the least significant bit) from the channel every sixth and twelfth frames, in which the latter frames correspond to A and B signaling messages. Each signaling bit of each of the 24 channels relates only to the associated channel. As is well-known, the borrowed signaling bit of a channel is available more than 1300 times each second, which suffices to transmit supervisory signals (e.g., off-hook and on-hook) and other signaling information.

With the foregoing in mind, assume that a user causes terminal S1 to go off-hook and dials a telephone number that will route the associated call through network 200. PBX 190, responsive to the off-hook accumulates the dialed digits and then determines that the call is to be routed over path 195, and therefor, assigns the call to an idle channel of path 195. As result of the assignment, T1 carrier equipment (not shown) located and interfacing with PBX 190 changes the state of the signaling bit of the assigned channel in the sixth and twelfth frames to a one. PBX 190 then outputs each of the dialed digits to path 195 via the latter equipment and assigned channel. Interface port circuit 241 of module 260 multiplexes the contents (eight bit byte) of each of the twenty four channels to respective signaling paths 242 extending to an associated EC 244, which then sends the signaling bits to a respective input port of switch 215 and to the associated signal processor 265. Signal processor 265 of module 260 monitors the contents of the aforementioned assigned channel and responds upon receipt of signaling information via the borrowed bits. That is, signal processor 240 associates the assigned channel with a trunk identifier and associates the 24 channels with a TSG identifier. Signal processor 240 then begins to accumulate the digits that will be transmitted via succeeding ones of the assigned channel. When signal processor receives the last of the dialed digits it then forms an IAM message addressed to switch 215, in which the message also contains, inter alia (a) the trunk and TSG identifiers that have been associated with the assigned channel, (b) calling station ANI and (c)dialed digits. Signal processor 240 of module 260 then transmits the message to switch 215 via STP 250-4 and network 200 SS7 network. Switch 215 similarly responds to the receipt of the message in the manner discussed above.

Signal processor 240 performs an opposite function with respect to signaling information (e.g., call complete message, termination message, etc.,) that it receives from switch 215. For example, responsive to receipt of a call complete message, signal processor 240 of module 260 converts the messages into the T1 carrier protocol and then transmits the message to nodal 190 one bit at a time using the borrowed signaling bit of a return channel assigned to the call.

The foregoing is merely illustrative of the principles of the invention. Those skilled in the art will be able to devise numerous arrangements, which, although not explicitly shown or described herein, nevertheless embody those principles that are within the spirit and scope of the invention. For example, one or more of the analog type telephone stations sets shown in the FIGs. may be ISDN type station sets. As another example, a CO switch may be an ATM based switch and one or more IXC switches may be a STM based switch.

We claim:

1. A method of establishing a connection for a call that is being forwarded from an origination STM switch to an intended destination switch via an ATM network formed from a plurality of interconnected ATM switches, said method comprising the steps of at said first STM switch, transmitting routing information associated with said call to a first one of said ATM switches via an out-of-band signaling network, said routing information including at least a called telephone number and identity of a trunk over which said STM switch will forward said call to said first ATM switch, providing an interface between each of said ATM switches and said out-of-band signaling network to translate an identity of a trunk contained in routing information received via said out-of-band signaling network into at least a predetermined virtual channel identifier, and receiving said routing information associated with said call at said first ATM and translating the trunk identity contained in such routing information into a particular virtual channel identifier and routing said call through said first ATM switch as a function of said particular virtual channel identifier.

2. The method of claim 1 wherein said step of translating includes the step of translating said trunk identity into said particular virtual channel identifier on a one-to-one basis such that said particular virtual channel identifier is made to equal said trunk identity.

3. The method of claim 1 wherein said routing information associated with said call includes an identity of a trunk subgroup associated with trunk identified in the routing information and wherein said step of translating includes the step of translating the identity of said trunk subgroup into a virtual path identifier.

4. The method of claim 3 wherein said step of translating the identity of said trunk subgroup includes the step of translating said trunk subgroup identity into said virtual path identifier on a one-to-one basis such that said virtual path identifier is made to equal said trunk subgroup identity.

5. The method of claim 4 wherein said method further comprises the step of translating said virtual circuit and virtual path identifiers into output virtual circuit and virtual path identifiers as a function of a called number associated with said call and wherein said step of routing includes the step of routing said call through said first ATM switch as a function Of said output virtual circuit and virtual path identifiers.

6. The method of claim 5 further comprising the steps of at said first ATM switch, deriving, as a function of at least said output virtual circuit identifier, an identity of an outgoing trunk and associated trunk subgroup defining a path to a second one of said ATM switches that will forward said call to said destination, generating a call set-up message containing at least (a) the identity of said outgoing trunk and (b) said called number, and sending said call set-up message to said second ATM switch via said out-of-band signaling network.

7. The method of claim 6 further comprising the steps of receiving said call set-up message at the interface interfacing said second ATM switch with said out-of-band signaling network, and responsive to receipt of said call-set up message, translating the identity of the outgoing trunk and associated trunk subgroup contained in said message into an input port, virtual circuit and virtual path identifiers, respectively, determining, as a function of the called number, at least an identity of an output port, and output virtual circuit and virtual path identifiers that may be used at said second switch to forward said call to said destination and supplying the identity of said output port and output virtual circuit and virtual path identifiers to said second switch input port so that voice signals received via said first ATM switch and associated with said call may be routed to said output port via a virtual connection derived as a function of said second switch outgoing virtual circuit and virtual path identifiers.

8. The method of claim 7 further comprising the steps of at said second ATM switch, respectively translating said second switch output virtual circuit and virtual path identifiers into an outgoing trunk and associated trunk subgroup defining a path to said destination, generating a call set-up message containing at least (a) identifiers respectively identifying said outgoing trunk and associated trunk subgroup, and (b) said called number, and sending said call set-up message toward said destination via said out-of-band signaling network.

9. The method of claim 1 further comprising the steps of at a terminal adapter interfacing said first ATM switch with said trunk, accumulating voice signals received over said trunk and forming the accumulated signals into a message having a format acceptable to said first ATM switch, translating said trunk identity and identity of an associated trunk subgroup into respective virtual channel and virtual path identifiers and affixing said identifiers to said accumulated signals, and supplying the resulting message to an input of said first ATM switch.

10. The method of claim 8 further comprising the steps of at a terminal adapter interfacing said output port of said second ATM switch with said destination, responsive to receipt of a data cell containing a sequence of octets from said output port, supplying the payload of the data cell to an ATM adaptation layer function such that the adaptation layer function supplies respective ones of the octets to a trunk of a trunk subgroup associated with a communications path extending to said destination, in which said trunk and trunk subgroup associated with said path are selected as a function of the outgoing virtual circuit and virtual path identifiers determined by said second switch.

11. The method of claim 1, wherein said out-of-band signaling is performed over a Signaling System 7 network.

12. A method of interfacing an ATM switch of an ATM network with an out-of-band signaling network comprising the steps of interconnecting said ATM switch with said out-of-band signaling network, and responsive to receiving via said out-of-band signaling network a message containing, inter alia, an identity of a trunk over which voice signals associated with a telephone call will be transported, translating said identity into at least a virtual circuit identifier and an identity of an incoming port which will receive said voice signals at said ATM switch.

13. The method of claim 12 further comprising the step of determining, as a function of a called number associated with said telephone call, an output port that may be used to forward said voice signals to their intended destination and at least an output virtual circuit identifier identifying an associated virtual circuit connection that may be used to route said voice signals from said input port to said output port.

14. The method of claim 13 further comprising the steps of translating said output virtual circuit identifier into an identifier identifying an output trunk, generating a call set-up message containing at least (a) the identifier identifying said output trunk, and (b) said called number, and sending said call set-up message to a destination switch.

15. A method of a transmitting signaling messages from a first ATM switch to a second ATM switch comprising the steps of connecting said first and second ATM switches to an out-of-band signaling network via respective signaling interface arrangements, at each of said interface arrangements, responsive to receipt of a signaling message via said out-of-band network in which the message identifies at least a trunk and associated trunk subgroup over which a respective telephone call is to be routed to the associated one of said ATM switches, translating said trunk and trunk subgroup identities into respective virtual circuit and virtual path identifiers and passing said identifiers to the associated one of said switches, and responsive to receiving output virtual channel and virtual path identifier from the associated one of said switches, respectively translating said output virtual channel and virtual path identifiers into an output trunk identifier and trunk subgroup identifier and transmitting a signaling message containing said trunk and said trunk group identifiers over said out-of-band signaling network.

16. The method of claim 15 wherein said step of translating said trunk identity and trunk subgroup identity into respective virtual circuit and virtual path identifiers includes the step of performing the translating on a one-to-one basis such that said trunk identity and trunk subgroup identity are made to equal said virtual circuit and virtual path identifiers, respectively.

17. The method of claim 15 wherein said step of translating said output virtual channel and virtual path identifiers into output trunk and trunk subgroup identifiers includes the step of performing the translating on a one-to-one basis such that identities of said output virtual channel and virtual path identifiers are made to respectively equal said output trunk and trunk subgroup identifiers.

* * * * *